United States Patent [19]

Alten

[11] Patent Number: 4,510,638
[45] Date of Patent: * Apr. 16, 1985

[54] TRANSFER BRIDGE FOR RAMPS

[76] Inventor: Kurt Alten, Ringstr. 14, D-3015 Wennigsen, Fed. Rep. of Germany

[ * ] Notice: The portion of the term of this patent subsequent to May 10, 2000 has been disclaimed.

[21] Appl. No.: 384,349

[22] Filed: Jun. 2, 1982

[30] Foreign Application Priority Data

Jun. 3, 1981 [DE] Fed. Rep. of Germany ........ 3121994

[51] Int. Cl.³ ................................................ E01D 1/00
[52] U.S. Cl. ......................................... 14/71.7; 14/71.1
[58] Field of Search ...................... 14/71.7, 71.3, 71.1, 14/69.5; 91/35

[56] References Cited

U.S. PATENT DOCUMENTS

| 3,138,812 | 6/1964 | Prosser | 14/71.3 |
| 3,167,796 | 2/1965 | Layne | 14/71.3 |
| 3,845,690 | 11/1974 | Ziegler | 91/35 |
| 4,112,823 | 9/1978 | Liberman et al. | 91/35 X |
| 4,382,307 | 5/1983 | Alten | 14/71.1 X |

FOREIGN PATENT DOCUMENTS

| 2545708 | 4/1977 | Fed. Rep. of Germany | 14/71.3 |
| 2552433 | 5/1977 | Fed. Rep. of Germany | 14/71.3 |

Primary Examiner—James A. Leppink
Assistant Examiner—Beverly E. Hjorth
Attorney, Agent, or Firm—Becker & Becker, Inc.

[57] ABSTRACT

With transfer bridges for ramps having an extension capable of being extended and retracted, and tongues capable of being pushed in, in connection with a bridge plate pivotably mounted on the ramp, a drive is associated with the extension. The drive retracts the extension by a small distance, for instance 20 mm, when the tongues are pushed in and arrested, in order to thus form a gap between the tongues and the vehicle which is to be loaded or unloaded, for avoidance of damage to the vehicle. The retraction of the extension is to occur with the release of the operating button intended for the extension of the extension, or for the lowering of the bridge plate dependent upon a time switch, so that the retraction movement of the extension can occur with a structurally simple double-acting cylinder.

3 Claims, 3 Drawing Figures

TRANSFER BRIDGE FOR RAMPS

The present invention relates to a dock leveler or transfer bridge for ramps, and has a bridge plate, the rear end of which is pivotable about a horizontal axis. The bridge plate is provided with a retractable and extendable extension, which in turn is provided with tongues which are capable of being pushed in; the extension is for placement on a platform which is to be loaded or unloaded. The tongues, in the pushed-in condition, are automatically arrested or secured.

According to the disclosure of applicant's copending U.S. Patent Application Ser. No. 243,713—Alten filed Mar. 16, 1981, now U.S. Pat. No. 4,382,307—Alten issued May 10, 1983, an actuator or drive means is associated with the tongues, or the extensions supporting these tongues; this drive retracts the tongues or the extension, subsequent to a pushing-in of the tongues, to form a gap between the tongues and the platform. The essential purpose of this is to prevent damage to the platform, including scratches and the like, in the pushed-in condition of the tongues. The tongues are held or locked in the "pushed-in" position according to FIGS. 3-5 inclusive of the disclosure of the aforementioned U.S. Pat. No 4,382,307—Alten issued May 10, 1983. The aforementioned gap prevents such damage to the platform.

The disclosure of this U.S. Pat. No. 4,382,307, dated May 10, 1983 and belonging to the owner of the present application, is incorporated herewith by reference thereto; tongues are held in the pushed-in position, for example, via structural means including a plate fastened below the tongues in order to hold or secure the tongues in the pushed-in position according to column 3, lines 23-25 of the specification of this U.S. Pat. No. 4,382,307.

According to the aforementioned copending application Ser. No. 243,713, now U.S. Pat. No. 4,382,307—Alten issued May 10, 1983, retraction of the tongues, or of the extension, is achieved by a special embodiment or construction of the working cylinder for the extension; in particular, two pistons are associated with this working cylinder, which normally serves as a feeding or advancing cylinder. These two pistons are movable in opposite directions. Although this construction has proven successful, it requires a special manufacture of the feed cylinders.

It is an object of the present invention to improve the aforementioned transfer bridges in such a way that a considerably simpler hydraulic installation can be used with a conventional dual-acting feed cylinder.

This object, and other objects and advantages of the present invention, will appear more clearly from the following specification in connection with the accompanying drawing, in which.

Figure 1:
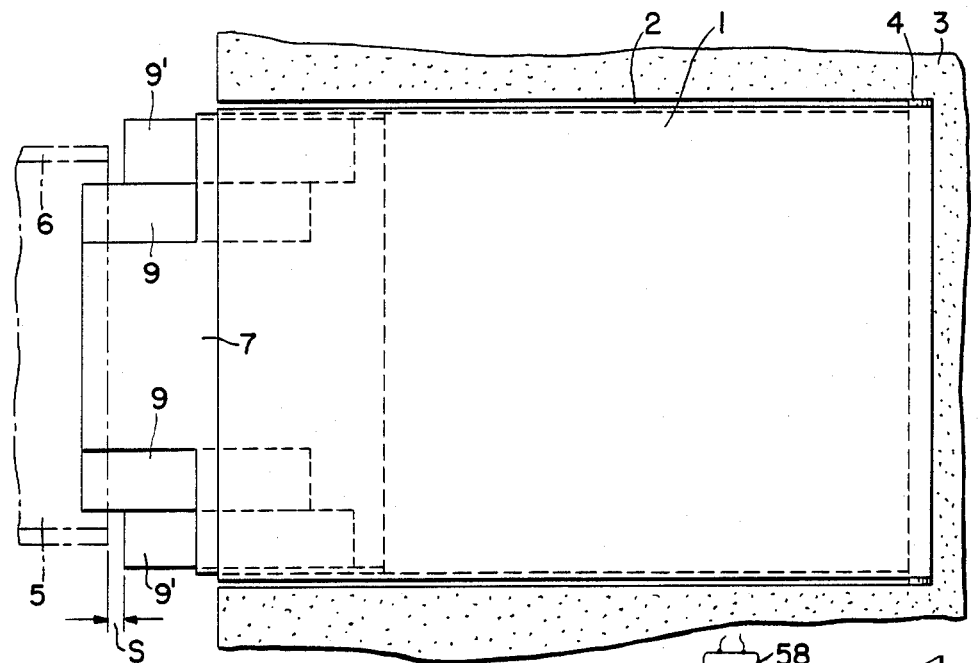
FIG. 1 is a plan view of one embodiment of a dock leveler or transfer bridge for ramps, in accordance with the present invention.

The transfer bridge of the present invention is characterized primarily in that the retraction of the extension or of the tongues, upon release of the operating element serving for the extension or the lowering of the extension (and lowering of the bridge plate subsequent to pushing-in the tongues) is effected dependent upon a time switch.

The disclosure of the present invention takes into consideration that the retraction or the extension movement of the tongues occurs free of load thereon; consequently, with the movement of the tongues, there occurs a predetermined speed of the working cylinder. A time allotment permitted for this retraction movement thereby results in a sufficiently great accuracy for creation of a gap, for instance of approximately 20 mm.

If the mentioned operating element is released, a time switch is mechanically actuated, for instance with the return movement of the operating button. The time switch brings about the retraction of the tongues within certain time limits. The control of the retraction with the operating element could also be carried out electrically; however, in each case there is to exist a limitation in time for the retraction movement of the tongues or of the extension movement of the tongues. Therefore, it is possible to use a double-acting hydraulic cylinder, having connections for extending and for retracting as well as including a commercially available working cylinder constructed as a double-acting cylinder, for performing this retraction movement.

According to specific features of the present invention, the operating element, or push button, may be provided with a run-up cam or ramp for a switch (time switch) that effects the retraction movement of the extension or the tongues.

The time switch may effect the retraction movement of the tongues or of the extension in the rest position of the associated operating element.

Referring now to the drawing in detail, the bridge plate 1, which is located inside a recess 2 of the dock or ramp 3, is journalled at its rear end about a horizontal axis 4 on the ramp 3, so that the bridge plate 1, by pivoting, can be adapted to different height platforms 5 of trucks or other load-carrying vehicles which are to be loaded or unloaded. Those walls of the vehicle, or of the platform 5 itself, laterally delimiting the platform 5, are designated with the reference numeral 6.

The hollow front end of the bridge plate 1 serves to receive and guide an extension 7, which can be retracted by a working cylinder or actuator means 8 into the bridge plate 1, or which can be extended thereby into the illustrated working position, in which the tip or free end of the extension 7 rests on the platform 4 in such a manner that the bridge plate 1 is supported on the platform 5 exclusively by the extension 7.

So that the extension 7 can adapt to different widths of platforms 5, tongues 9 are mounted on both sides of the extension 7 on a rearwardly movable segment of this extension. These tongues 9 can be pushed-in in the longitudinal direction of the transfer bridge, and are spring biased in such a manner that the pushing-in of the tongues 9 can occur only by overcoming the spring force, for instance when the tongues 9 strike the walls 6 during extension of the extension 7. The tongues which then engage or contact the walls 6 are designated by the reference numeral 9'.

A hydraulic lifting cylinder or actuator 10 serves for lifting the bridge plate 1. This lifting cylinder 10 is supported at the bottom on the foundation of the ramp 3 or on the base or bottom of the recess 2, and engages at the top approximately in the middle of the bridge plate 1.

The lifting cylinder 10 and the working cylinder 8 are components of a hydraulic system which can be constructed in any manner desired, and has a pressure generator, a storage tank, and operating elements that influence solenoid valves and the like via electrical connections.

For example, four operating elements 50, that can be provided in the form of push buttons 50, serve for bringing about raising and lowering the bridge plate 1, and for retracting and extending the extensions 7.

Figure 3:
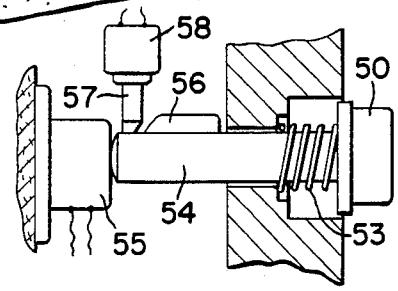
FIG. 3 is a schematic fragmentary sectional illustration showing an operating element or operating button for extending the extension of the bridge plate.

The operating or push button element 50 according to FIG. 3 serves for bringing about an extending of the extension 7 with the aid of the working cylinder 8, which is constructed as a double acting hydraulic cylinder, and has therewith the connections 51 (for extending) and 52 (for retracting).

The operating element or push button 50 can be pressed in against the action of the compression spring 53, whereby the stem 54 of the operating element 50 acts on an electrical switch 55 which influences a solenoid valve that feeds pressure medium to the connection 51.

A run-up cam or ramp 56 is located on the stem 54 for a push rod or plunger 57 of a time switch 58 which in turn can act on the connection 52 via a solenoid valve in order to effect a retraction of the extension 7.

To actuate the transfer bridge after approach of the vehicle to the ramp 3, the bridge plate 1 is first swung up by actuating the lifting cylinder 10. The bridge plate 1 is then lowered. When the front end of the bridge plate 1 is located approximately 20 cm above the platform 5, the extension 7 is extended by pressing the operating button 50, whereby the tongues 9' strike the walls 6 and thereby arrest themselves in the pertaining position.

The time switch 58 is actuated with the pushing-in of the stem 54; the time switch 58, however, as long as it rests on the cam or ramp 56, i.e. during the time the operating button 50 is pressed in, does not perform any function. If however the operating button 50 is released to terminate the extension of the extension 7, the push button 50 again occupies its rest position, and the push rod 57 moves into the position according to FIG. 3, whereby it provides for actuation of the connection 52, though only for a predetermined time interval, which is determined by the time switch 58. As a result, a retraction of the extension 7 by approximately 15 mm occurs.

Figure 2:
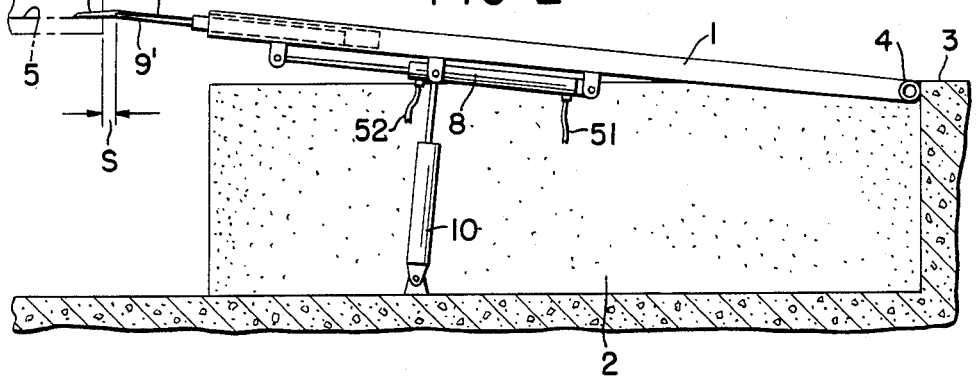
FIG. 2 is a side view of the bridge of FIG. 1, and in particular in the operating position, just as in FIG. 1.

Thereupon the placement of the extension 7 occurs on the platform 5. With the abovementioned retraction of the extension 7, the extension 7 occupied such a position that in the operating condition according to FIGS. 1 and 2, between the tongues 9' on the one hand, and the wall 6 on the other hand, there still remains a gap S of approximately 15 mm.

This return movement of the extension 7 can also be brought about by the operating button which permits the bridge plate 1 to lower when the tongues 9' are pushed-in and the extension 7 is to be placed on the platform 5. This can be analogously controlled and effected, for instance simultaneously with the lowering; in this situation too, the movement of the extension 7 is limited by a time switch.

The present invention is, of course, in no way restricted to the specific disclosure of the specification and drawing, but also encompasses any modifications within the scope of the appended claims.

What I claim is:

1. A transfer bridge for use between a ramp and a platform, said bridge comprising:

a bridge plate having a first end and a second end, said first end being pivotably connected to said ramp in such a way as to be pivotable about a horizontal axis;

a retractable and extendable extension provided in said second end of said bridge plate for placement on said platform;

tongues supported by and extending from said extension, and capable of being respectively pushed in, i.e., of being pushed toward said first end of said bridge plate; means to hold said tongues, in the pushed-in state, structurally arrested in position;

double-acting drive means associated with said extension and said tongues respectively for extending same, and for retracting same subsequent to a pushing-in of said tongues, to form a gap between said pushed-in tongues and said platform;

first operating elements associated with said drive means for respective actuation of the extension and retraction functions thereof, and a second operating element associated with said bridge plate for actuation of a lowering pivotal movement thereof; and a time switch associated with either of said first operating elements serving to actuate the extension function of said drive means or said second operating element bringing about the lowering pivotal movement of said bridge plate, upon the release of one of said operating elements, said time switch effecting a partial retraction of said extension and said tongues.

2. A transfer bridge according to claim 1, in which that operating element which serves for respectively the extension function of said drive means as a working cylinder and the lowering pivotal movement of said bridge plate, is provided with a run-up cam for said time switch, which effects a retraction movement of one of said extension and said tongues.

3. A transfer bridge according to claim 1, in which said time switch effects said retraction movement of said extension and said tongues in a rest position upon release of that first and second operating element which serves for respectively the extension function of said drive means and the lowering pivotal movement of said bridge plate.

* * * * *